United States Patent Office 3,120,518
Patented Feb. 4, 1964

3,120,518
POLYHYDROXYLATED PREGNANES AND
PREPARATION THEREOF
Daniel Bertin, Montrouge, Lucien Nedelec, Vallee des Anges (Clichy-sous-Bois), and Antoine Locatelli, Aubervilliers, France, assignors to Roussel-UCLAF, Paris, France, a corporation of France
No Drawing. Filed Feb. 21, 1962, Ser. No. 174,692
Claims priority, application France June 16, 1960
24 Claims. (Cl. 260—239.55)

The invention relates to novel polyhydroxylated pregnanes having the formula

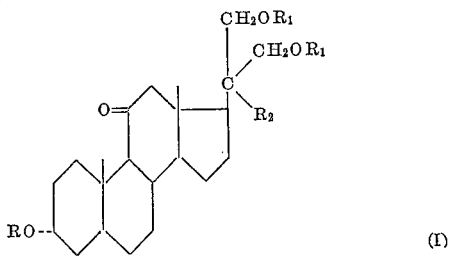

wherein R and $R_1$ are selected from the group consisting of hydrogen, and acyl radical of an organic carboxylic acid having 1 to 18 carbon atoms and an anion of a mineral acid and $R_2$ is selected from the group consisting of hydrogen, —$CH_2OR_1$ and —$OR_1$. The invention further relates to a novel process for the production of said pregnanes and novel intermediates thereof.

The compounds of Formula I are useful as coronary dilators and are used in the treatment or prevention of cardiopathy caused by an insufficient flow of blood in the coronaries. The present compounds have an activity superior to the 20-bis-(hydroxymethyl)-pregnanes and their esters disclosed in copending application Serial No. 88,282, filed February 10, 1961, now U.S. Patent No. 3,052,675.

It is an object of the invention to provide novel polyhydroxylated pregnanes of Formula I.

It is a further object of the invention to provide a novel process for the preparation of polyhydroxylated pregnanes of Formula I.

It is another object of the invention to provide novel intermediates for polyhydroxylated pregnanes of Formula I.

These and other objects and advantages of the invention will become obvious from the following detailed description.

The polyhydroxylated pregnanes of the invention have the formula

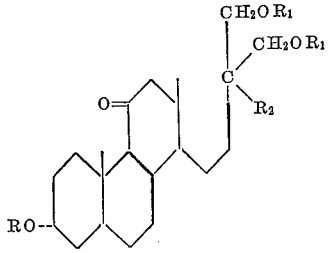

wherein $R_2$ is selected from the group consisting of hydrogen, —$CH_2OR_1$ and —$OR_1$ and R and $R_1$ are selected from the group consisting of hydrogen, an anion of a mineral acid and an acyl radical of an organic carboxylic acid having 1 to 18 carbon atoms.

This organic carboxylic acid having 1 to 18 carbon atoms may be aliphatic, aromatic or cycloaliphatic. Suitable organic carboxylic acids are alkanoic or alkenoic acids such as acetic acid, trimethyl acetic acid, propionic acid, 4,4-dimethyl pentanoic acid, 10-undecenoic acid; cycloalkyl-alkanoic acids such as β-cyclopentyl propionic acid; aryl alkanoic acids such as phenyl propionic acid; cycloalkanoic acids such as hexahydrobenzoic acid and hexahydroterephthalic acid, and phenyl carboxylic acids such as benzoic acid and 3,5-dinitrobenzoic acid. Examples of suitable mineral acids are nitric acid, sulfuric acid and phosphoric acid.

The novel intermediates of the invention have the formula

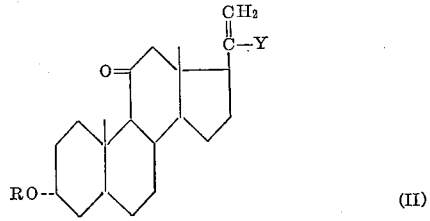

wherein R has the above definition and Y is selected from the group consisting of —$CH_2OR$ and —CHO.

The process of the invention comprises oxidizing $\Delta^{17(20)}$-5β-pregnene-3α,21-diol-11-one to form $\Delta^{17(20)}$-5β-pregnene-3α-ol-11,21-dione, esterifying the latter if desired, catalytically hydrogenating the $\Delta^{17(20)}$ double bond of the latter to form 5β-pregnane-3α-ol-11,21-dione or its 3-acyloxy derivative and reacting the latter with formaldehyde in a water-miscible organic solvent in the presence of an alkaline agent to form a mixture of 20-bis-(hydroxymethyl)-5β-pregnane-3α,21-diol-11-one or its 3-acyloxy derivative, 20-hydroxymethyl-5β-pregnane-3α,21-diol-11-one or its 3-acyloxy derivative and 20-methylene-5β-pregnane-3α-ol-11,21-dione or its 3-acyloxy derivative.

The reaction mixture is separated into its components and the 20-bis-(hydroxymethyl)-5β-pregnane-3α,21-diol-11-one and 20-hydroxymethyl-5β-pregnane-3α,21-diol-11-one or their 3-acyloxy derivatives may be esterified with an organic carboxylic acid having 1 to 18 carbon atoms or a mineral acid if desired.

The 20-methylene-5β-pregnene-3α-ol-11,21-dione may be reduced with an alkali metal borohydride to form 20-methylene-5β-pregnane-3α,21-diol-11-one and the latter is acylated and then treated with osmium tetraoxide and saponified to form 20-hydroxymethyl-5β-pregnane-3α,20,21-triol-11-one. The latter compound may then be esterified as before if the esters are desired.

A preferred mode of the process of the invention comprises oxidizing $\Delta^{17(20)}$-5β-pregnene-3α,21-diol-11-one in the presence of manganese dioxide to form $\Delta^{17(20)}$-5β-pregnene-3α-ol-11,21-dione, acylating the latter, catalytically hydrogenating the latter in the presence of palladized charcoal to form 3α-acyloxy-5β-pregnane-11,21-dione, reacting the said product or its 3-hydroxy derivative formed by saponification with formaldehyde in a N,N-di-lower alkyl-lower alkanoylamide such as dimethyl formamide in the presence of an alkali metal or an alkaline earth metal oxide or hydroxide such as calcium hydroxide to form the reaction mixture which is separated into its three components by crystallizing 20-bis-(hydroxymethyl)-5β-pregnane-3α,21-diol-11-one or its 3-acyloxy derivative from an organic solution of the reaction mixture. The organic solution is then subjected to chromotography and 20-methylene-5β-pregnane-3α-ol-11,21-dione or its 3-acyloxy derivative and 20-hydroxymethyl-5β-pregnane-3α,21-diol-11-one or its 3-acyloxy derivative are selectively eluted.

The 20-methylene-5β-pregnane-3α-ol-11,21-dione is reduced with sodium borohydride to form 20-methylene-5β-pregnane-3α,21-diol-11-one and the latter is acylated in the 3 and 21-positions, treated with osmium tetraoxide to form after saponification 20-hydroxymethyl-5β-pregnane-3α,20,21-triol-11-one. Each of the three products or their 3α-acyloxy derivatives may then be esterified such as reaction with fuming nitric acid at temperature, between —5° and —15° to form the corresponding nitrates, or the corresponding nitrato esters of their 3α-acyloxy compounds. Th reaction scheme for the process is illustrated in Table I.

11-one esterified in the 20-hydroxymethyl and 21-hydroxy positions with a mineral acid or an ortho acid with dibenzyl halophosphonate to form the corresponding 3α-dibenzylphosphato compound, subjecting the latter to hydrogenolysis to form the desired 3α-phosphato steroid. If desired the ester, may be saponified before or after the

TABLE I

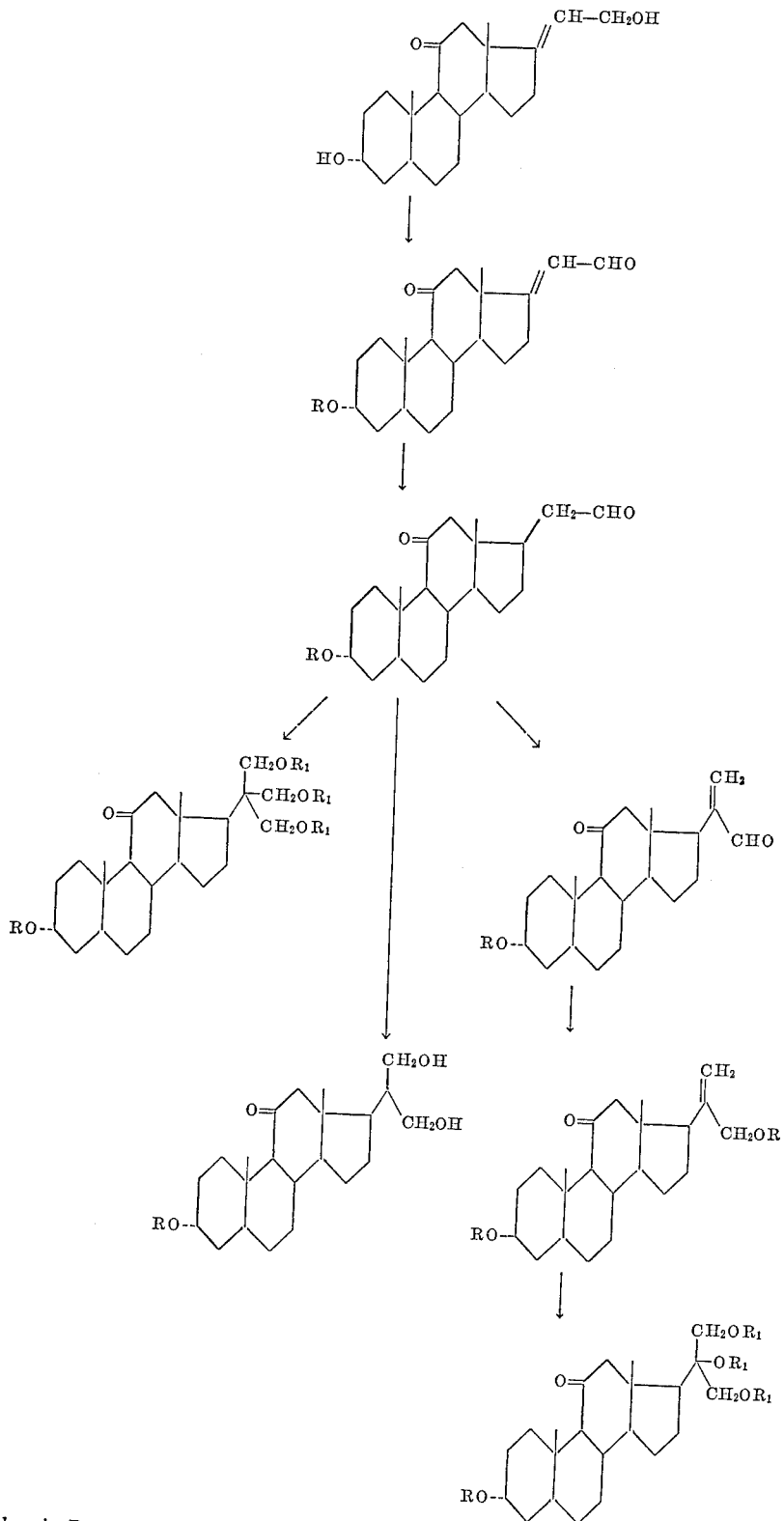

wherein $R_1$ and R have the above definitions.

The 3α-phosphate group may be introduced by the reaction of 20-bis-(hydroxymethyl)-5β-pregnane-3α,21-diolhydrogenolysis step. The alkali metal salts of the 3α-phosphato compounds are easily formed by reaction with an alkali metal alkanolate.

A preferred mode of the process comprises reacting 20-bis-(nitratomethyl)-21-nitrato - 5β - pregnane-3α-ol-11-one with an ether solution of dibenzyl chlorophosphonate to form 3α-dibenzylphosphato-20-bis-(nitratomethyl)-21-nitrato-5β-pregnane-11-one, subjecting the latter to hydrogenolysis in the presence of palladized carbon black in methanol to form 3α-phosphato-20-bis(nitratomethyl)-21-nitrato-5β-pregnane-11-one, reacting the latter with sodium methylate to form the corresponding disodium salt of the said 3α-phosphato compound and recovering the latter.

Another preferred method comprises reacting 1′-[5β-androstane-3α-ol-11-one - 17β - yl]-3′,5′,8′-trioxabicyclo-(2,2,2)-octane with dibenzyl chlorophosphonate to form the corresponding 3α-dibenzylphosphato compound, hydrolyzing the latter under acidic conditions such as hydrochloric acid to form 3α-dibenzylphosphato-20-bis-(hydroxymethyl)-5β-pregnane-21-ol-11-one, subjecting the later to hydrogenolysis in the presence of palladized carbon black in methanol to form 3α-phosphato-20-bis-(hydroxymethyl)-5β-pregnane-21-ol-11-one which may be reacted with sodium methylate to form the corresponding disodium salt of the said 3α-phosphato compound or reacted with fuming nitric acid at −5° to −15° C. to form 3α-phosphato - 20 - bis - (nitratomethyl) - 21 - nitrato-5β-pregnane-11-one and then react the latter to form the corresponding disodium salt. The reactions are illustrated in Table II.

In the following examples there are described several preferred embodiments to illustrate the invention. However, it should be understood that the invention is not intended to be limited to the specific embodiments.

EXAMPLE I

Step A—Preparation of $\Delta^{17(20)}$ - 5β - pregnene - 3α - ol-11,21-dione.—17.5 gm. of $\Delta^{17(20)}$-5β-pregnene-3α,21-diol-11-one, (obtained according to Sarett et al., J. Biol, Chem., 162,601 (1946), were introduced into 1,750 cc. of chloroform, 52.5 gm. of manganese dioxide were added and the reaction mixture was agitated for a period of 26 hours at a temperature of 20° to 25° C. The reaction mixture was filtered and evaporated to dryness under vacuum to obtain 17.4 gm. (quantitative yield) of $\Delta^{17(20)}$-5β-pregnene-3α-ol-11,21-dione, having a melting point of 189° C. and a specific rotation $[\alpha]_D^{20}=+48°\pm1°$ (c.=0.5% in acetone). The new product was in the form of colorless crystals. It was insoluble in water, soluble in acetone and chloroform, recrystallizable from ethyl acetate.

Analysis.—$C_{21}H_{30}O_3$: Molecular weight=330.45. Calculated: C, 76.33%; H, 9.15%; O, 14.53%. Found: C, 76.4%; H, 9.1%; O, 14.8%.

Step B—Preparation of 3α-acetoxy-$\Delta^{17(20)}$-5β-pregnene-11,21-dione.—1.84 gm. of $\Delta^{17(20)}$-5β-pregnene-3α-ol-11,21-dione, obtained according to the preceding step, were dissolved in 4 cc. of pyridine. 2 cc. of acetic acid anhydride were added and the reaction mixture allowed to stand for

TABLE II

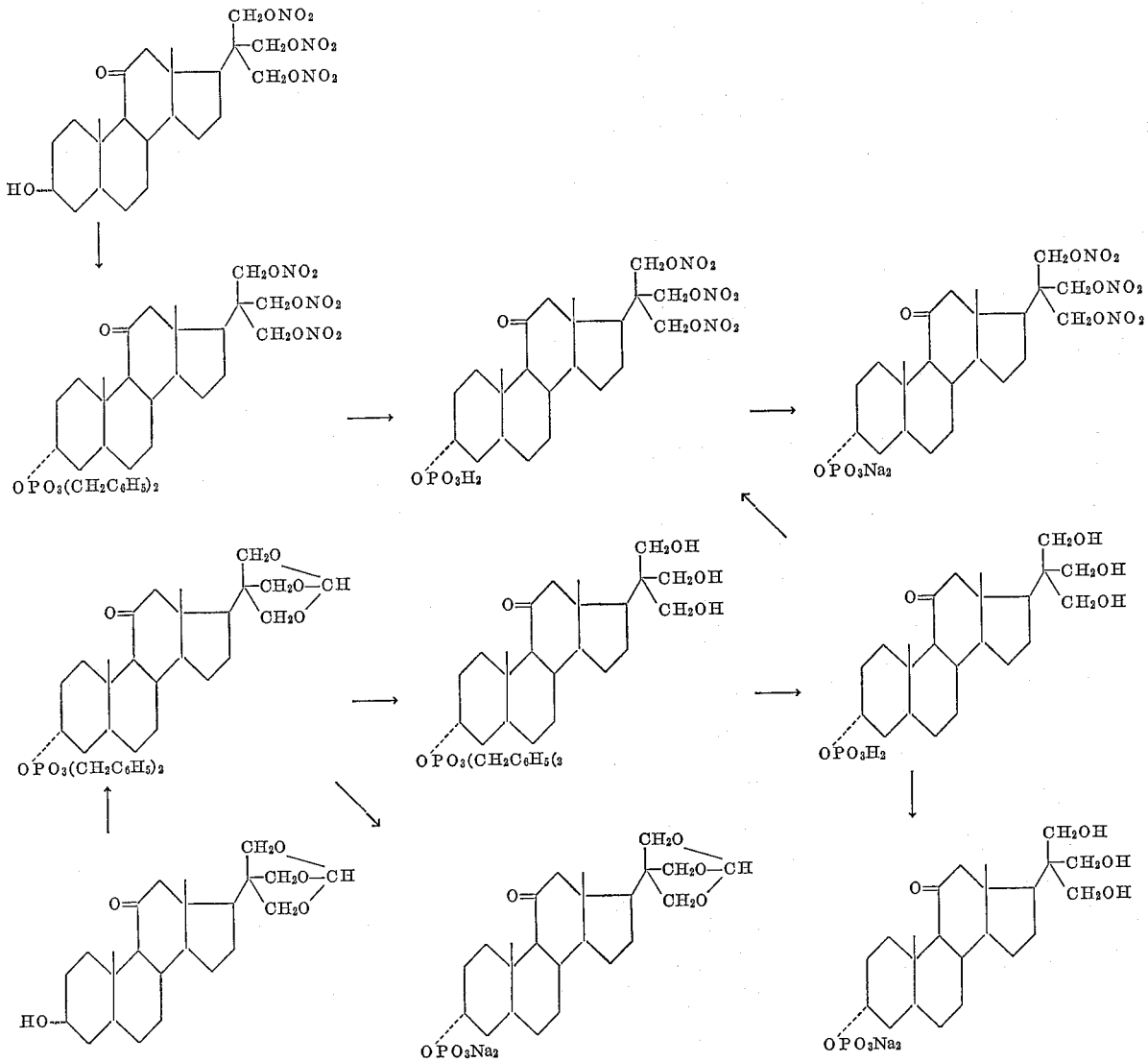

a period of 4 hours under nitrogen at a temperature of 20° to 25° C. The reaction mixture was poured into 60 cc. of a mixture of water and ice. The precipitate was vacuum filtered, washed with water and dried in an oven in order to obtain 1.83 gm. (91%) of $\Delta^{17(20)}$-3α-acetoxy-5β-pregnene-11,21-dione having a melting point of 170° C. The product was present in the form of crystals insoluble in water, slightly soluble in alcohol and ether, soluble in acetone, benzene, chloroform, ethyl acetate and dioxane. It has not yet been described.

*Analysis.*—$C_{23}H_{32}O_4$: Molecular weight=372.49. Calculated: C, 74.16% H, 8.66%. Found: C, 74.0%; H, 8.5%.

*Step C—Preparation of 3α-acetoxy-5β-pregnane-11,21-dione.*—0.46 gm. of carbon black containing 10% of palladium were introduced into 25 cc. of methanol. The suspension was hydrogenated. 4.6 gm. of $\Delta^{17(20)}$-3α-acetoxy-5β-pregnene-11,21-dione, obtained according to the preceding step, in solution in 187 cc. of methanol were added. The suspension was hydrogenated until the absorption of the theoretical amount of hydrogen. The catalyst was filtered. The solution was evaporated to dryness under vacuum and the residue was redissolved in 15 cc. of hot isopropyl ether. The solution was cooled and vacuum filtered in order to obtain 2.96 gm. (65%) of 3α-acetoxy-5β-pregnane-11,21-dione having a melting point of 119° to 120° C. The new product was in the form of small white crystals, insoluble in water, slightly soluble in petroleum ether and isopropyl ether, soluble in alcohol and in chloroform.

*Analysis*—$C_{23}H_{34}O_4$: Molecular weight=374.5. Calculated: C, 73.76%; H, 9.15%. Found: C, 73.9%; H, 9.2%.

*Step D—Preparation of 5β-pregnane-3α-ol-11,21-dione.*—0.1 gm. of 3α-acetoxy-5β-pregnane-11,21-dione obtained in the preceding step was introduced into 2 cc. of a mixture made up of 3 cc. of N sodium hydroxide and 17 cc. of ethanol. The reaction mixture was agitated for a period of 4 hours at room temperature, neutralized by 2 drops of acetic acid, a little bit of water added and extracted with methylene chloride. The methylene chloride solution was decanted, dried and distilled to dryness. 0.09 gm. of a gum soluble in alcohol and in chloroform, slightly soluble in isopropyl ether was obtained. A study of the infrared spectra and of the rotatory dispersion showed that the product obtained was 5β-pregnane-3α-ol-11,21-dione, utilizable directly for the following step of the synthesis.

*Step E—Preparation of 20-bis-(hydroxymethyl) - 5β-pregnane-3α,21-diol-11-one.*—1.66 gm. of 5β-pregnane-3α-ol-11,21-dione, obtained according to the preceding step, were introduced into 25 cc. of dimethylformamide. 20 cc. of a 20% formaldehyde solution and 0.5 gm. of calcium hydroxide were added at 45° C. and under agitation. The temperature was maintained for a period of 2 hours at 50° C., then another 0.7 gm. of lime was added and reheated at 65° C. The reaction mixture was cooled, 50 cc. of water were added and the mixture was acidified to a pH of 2 by the addition of N hydrochloric acid. The reaction mixture was extracted with ethyl acetate. The extracts were washed with 0.1 N hydrochloric acid, with water, with bicarbonate and with water, dried over magnesium sulfate and evaporated to dryness under vacuum. The residue was taken up in 5 cc. of chloroform and allowed to crystallize. The crystals were vacuum filtered and dried in order to obtain 0.27 gm. (14%) of 20-bis-(hydroxymethyl)-5β-pregnane-3α,21-diol-11-one having a melting point of 244° C. and 248° to 249° C., and a specific rotation $[\alpha]_D^{20}=+40°\pm1°$ (c.=0.5% in ethanol).

The product was also obtained starting from 3α-acetoxy-5β-pregnane-11,21-dione. The method of operation was the same. The intermediate 3α-acetoxy-20-bis-(hydroxymethyl)-5β-pregnane-21-ol-11-one [melting point= 208° C. and specific rotation $[\alpha]_D^{20}=55$ (ethanol)] was isolated and was saponified by treatment with alcoholic potassium hydroxide.

The 20-bis-(hydroxymethyl) - 5β - pregnane-3α,21-diol-11-one as well as the 3α-acetyl derivative have not yet been described. The free alcohol was present in the form of fine colorless needless, insoluble in ether, acetone, benzene and chloroform, soluble in dimethylformamide, and slightly soluble in alcohol and in dioxane.

*Analysis*—$C_{23}H_{38}O_5$: Molecular weight=394.53. Calculated: C, 70.01%, H, 9.71%. Found: C, 69.9%; H, 9.7%.

The 3-acetate had a melting point of 193–195° C. and 212° C.

*Step F—Preparation of 20-methylene-5β-pregnane-3α-ol-11,21-dione and its acetate.*—The chloroformic mother liquors obtained in the preceding step from the crystallization of 20-bis-(hydroxymethyl)-5β-pregnane-3α,21 - diol-11-one or of the acetate were subjected to chromotography on 150 gm. of magnesium silicate. After elution with methylene chloride containing 1.5% of methanol (1% for the acetate), there were obtained after evaporation to dryness of the eluate and crystallization from isopropyl ether the 20-methylene-5β-pregnane-3α-ol-11,21-dione or its acetate with a yield of 40% calculated on the amount of the aldehyde.

The free alcohol had a melting point of 153° C. and about 168° C. and a specific rotation $[\alpha]_D^{20}=+72°$ (c.= 0.25% in acetone) and was present in the form of small white prisms, insoluble in water, soluble in alcohol, ether, acetone and chloroform slightly soluble in isopropyl ether. It has not yet been described.

*Analysis.*—$C_{22}H_{32}O_3$: Molecular weight=344.48%. Calculated: C, 76.4%; H, 9.36%. Found: C, 76.5%; H, 9.4%.

The acetate had a melting point of 150° C.

A new elution of the magnesium silicate by methylene chloride containing 7% methanol furnished 20-hydroxymethyl-5β-pregnane-3α,21-diol-11-one or the corresponding 3-acetate with a yield of 15%. The free alcohol had a melting point of 187° to 188° C., and a specific rotation $[\alpha]_D^{20}=+55.4$ (c.=0.5% in ethanol). The 3-acetate had a melting point of 154 to 155° C.

The free alcohol was present in the form of small white needles, insoluble in water, slightly soluble in benzene and chloroform, soluble in alcohol and dioxane. It has not yet been described.

*Analysis.*—$C_{22}H_{36}O_4$: Molecular weight=364.5. Calculated: C, 72.49%; H, 9.96%. Found: C, 72.4%; H, 10.0%.

*Step G—Preparation of 20-methylene-5β-pregnane-3α, 21-diol-11-one.*—195 mg. of 20-methylene-5β-pregnane-3α-ol-11,21-dione, prepared in the preceding step, were dissolved in 20 cc. of methanol. The solution was cooled to 0° C. and 47 mg. of sodium borohydride were added. The reaction mixture was agitated for a period of 1 hour at 0° C., neutralized by addition of acetic acid, evaporated to dryness under vacuum and the residue was taken up in 2 cc. of methanol. The product was precipitated by addition of 4 cc. of water. The precipitate was filtered, washed with water and dried in order to obtain 176 mg. (90%) of 20-methylene-5β-pregnane-3α,21-diol-11-one having a melting point of 150° C.

The product which has not yet been described occurred in the form of small white needles, insoluble in water, soluble in alcohol, ether, acetone and chloroform.

*Analysis.*—$C_{22}H_{34}O_3$: Molecular weight=346.49. Calculated: C, 76.26%; H, 9.89%. Found: C, 76.31%; H, 9.85%.

*Step H—Preparation of 3α,21-diacetoxy-20-methylene-5β-pregnane-11-one.*—160 mg. of 20-methylene-5β-pregnane-3α,21-diol-11-one, obtained according to the preceding step, were dissolved in a mixture of 0.24 cc. of acetic acid anhydride and 0.48 cc. of pyridine and agitated for a period of 3 hours at room temperature. A small amount of ice and water was added. The precipitate was vacuum filtered, washed with water and dried in order to obtain 189 mg. (95%) of 3α,21-diacetoxy-20-methylene-5β-pregnane-11-one having a melting point of 106° to 108° C. The product which was new occurred in the form of small white crystals, insoluble in water, soluble in alcohol, ether and isopropyl ether.

*Analysis.*—$C_{26}H_{38}O_5$: Molecular weight=430.56. Calculated: C, 72.52%; H, 8.90%. Found: C, 72.1%; H, 9.1%.

*Step I—Preparation of 20-hydroxymethyl-5β-pregnane-3α,20,21-triol-11-one.*—116 mg. of 3α,21diacetoxy-20-methylene-5β-pregnane-11-one, prepared according to the preceding step, were dissolved in 3 cc. of ether. 231 mg. of osmium tetraoxide and 0.1 cc. of pyridine were added and the reaction mixture was agitated in a closed vessel for a period of 15 hours at room temperature. The reaction mixture was evaporated to dryness under vacuum. The residue was taken up in 3.5 cc. of ethanol. A solution of 580 mg. of sodium sulfite in 2.5 cc. of water was added and the reaction mixture was heated to reflux for a period of 4 hours. The reaction mixture was cooled, filtered and the filtrate evaporated to dryness under vacuum. The residue was taken up in 2 cc. of alcohol. 0.54 cc. of N sodium hydroxide solution was added to the solution and the solution was agitated for a period of 2 hours, neutralized with acetic acid and poured into water. The suspension was extracted with chloroform containing 20% of n-butanol. The extracts were washed with water, dried over magnesium sulfate and evaporated to dryness under vacuum. The residue was taken up in 2 cc. of methylene chloride, vacuum filtered and dried in order to obtain 70 mg. (68%) of 20-hydroxymethyl-5β-pregnane-3α,20,21-triol-11-one having a melting point of 220° C. and a specific rotation $[\alpha]_D^{20}=+56$ (ethanol). The product, which was new, was found in the form of colorless crystals soluble in alcohol and in hot water, slightly soluble in chloroform, insoluble in benzene.

*Analysis.*—$C_{22}H_{36}O_5$: Molecular weight=380.51. Calculated: C, 69.44%; H, 9.54%. Found: C, 69.7%; H, 9.4%.

*Step J—Preparation of 3α-acetoxy-21-nitrato-20-bis-(nitratomethyl)-5β-pregnane-11-one.*—0.5 cc. of 90% nitric acid were introduced into 1.5 cc. of acetic acid anhydride cooled to −10° C. Then over a period of one minute under agitation and under nitrogen at −10° C., 0.058 gm. of 3α-acetoxy-20-bis-(hydroxymethyl)-5β pregnane 21-ol-11-one were added. The agitation of the reaction mixture was continued for twenty minutes at a temperature of −10° C. and the mixture was then poured under agitation into ice water.

The precipitated product was filtered with suction and washed with water until the wash waters were neutral. The crude product was subjected to chromatography on a silica gel. After elution with methylene chloride containing 1% acetone, there was obtained after crystallizing from ethanol 0.056 gm. of 3α-acetoxy-21-nitrato-20-bis-(nitratomethyl)-5β-pregnane-11-one having a melting point of 162–163° C. and a specific rotation $[\alpha]_D^{20}=44°$ (acetone).

3α - acetoxy-20-hydroxymethyl-5β-pregnane-20,21-diol-11-one, 3α-acetoxy-20-hydroxymethyl-5β-pregnane-21-ol-11-one and 20-hydroxymethyl-5β-pregnane-3α,21-diol-11-one were nitrated in the same manner to obtain the respective nitrated products; 3α-acetoxy-21-nitrato-20-(nitratomethyl)-5β-pregnane-20-ol-11-one having a melting point of 80° C. and a specific rotation $[\alpha]_D^{20}=+45°$ (c.=0.38% in ethanol), 3α-acetoxy-21-nitrato-20-nitratomethyl-5β-pregnane-11-one having a melting point of 140° C. and a specific rotation $[\alpha]_D^{20}=+53°$ (chloroform) and 21-nitrato-20-nitratomethyl-5β-pregnane-3α-ol-11-one having a melting point of 115° C.

EXAMPLE II

*Preparation of the 3-Potassium Sulfate of 20-Bis-(Nitrato-Methyl)-21-Nitrato-5β-Pregnane-3α-Ol-11-One*

20-bis-(nitratomethyl) 21-nitrato-5β-pregnane-3α-ol-11-one was reacted with chlorosulfonic acid in the presence of pyridine at a temperature of about 0° to 5° C. to form the 3-pyridinium sulfate salt of 20-bis-(nitratomethyl)-21-nitrato-5β-pregnane-3α-ol-11-one.

A 15-cm. long column was filled with Dowex 50 (polystyrene sulfonic acid resin) in its acid form. The column was first washed with methanol and then with chloroform. A chloroform solution containing 56 mg. of the said 3-pyridinium sulfate salt was percolated slowly through the resin column which was then washed with chloroform. The acid fractions were recovered, combined and concentrated under vacuum to recover the 3-sulphate of 20-bis-(nitratomethyl)-21-nitrato-5β - pregnane-3α-ol-11-one.

The said free 3-sulfate was dissolved in 1.5 cc. of ethanol and then 0.25 cc. of an alcoholic solution of 0.43 N potassium hydroxide was added slowly thereto. The potassium salt crystallized and was recovered by centrifuging. The potassium salt was washed with alcohol, then ether and then dried to give 19 mg. of the 3-potassium sulfate of 20-bis-(nitratomethyl) - 21 - nitrato - 5β-pregnane-3α-ol-11-one having a melting point of about 200° C.

The said product occurred in the form of a solid colorless compound, soluble in water and alcohol and insoluble in ether, benzene and chloroform.

*Analysis.*—$C_{23}H_{34}O_{14}N_3SK$: Molecular weight=647.69. Calculated: C, 42.64%; H, 5.29%; K, 6.04%. Found: C, 42.1%; H, 5.5%; K, 6.5%.

An alternate method of preparing the 3-potassium sulfate of 20-bis-(nitratomethyl)-21-nitrato-5β-pregnane-3α-ol-11-one from the corresponding 3-pyridinium sulfate is by double decomposition with an ethanolic solution of potassium acetate. The 3-potassium sulfate salt precipitates immediately and after agitating the solution at room temperature for an hour, the solution is iced and the precipitate is recovered by filtration. After vacuum filtration of the precipitate, it was washed with first ether containing 10% alcohol and then with ether and then dried in the desiccator to obtain a 61% yield of the 3-potassium sulfate of 20-bis-(nitratomethyl)-21-nitratomethyl-21-nitrato-5β-pregnane-3α-ol-11-one based on the 3-pyridinium sulfate.

EXAMPLE III

*Preparation of 3α-Phosphato-20-Bis-(Nitratomethyl)-21-Nitrato-5β-Pregnane-11-One*

*Step A—Preparation of 3α-dibenzylphosphato-20-bis-(nitratomethyl)-21-nitrato-5β-pregnane-11-one.*—0.320 g. of 20-bis-(nitratomethyl)-21-nitrato-5β-pregnane - 3α - ol-11-one was dissolved in 3.2 cc. of pyridine. The solution obtained was cooled to −10° C. and in one amount 1.35 cc. of an ethereal solution of dibenzyl chlorophosphonate were added. The mixture was agitated for a period of 2 hours at about −5° C., allowed to remain overnight at 0° C., agitated for one hour and a half at 0° C., and added to ice and water. The mixture was extracted several times with methylene chloride. The combined extracts were washed successively with N hydrochloric acid, with water containing sodium chloride, with sodium hydroxide solution, with water containing sodium chloride and then with water saturated with sodium chloride. The organic solution was dried over magnesium sulfate and evaporated to dryness. Raw 3α-dibenzylphosphato-20-bis-(nitratomethyl)-21-nitrato - 5β-pregnane-11-one was obtained, which was purified by chromatography through magnesium silicate with elutions of methylene chloride and methylene chloride containing 0.6% of methanol, then repeated crystallizations from methanol. 0.275 g. of the pure product melting at about 110° C. was obtained.

The compound was soluble in alcohol, acetone, benzene and chloroform, slightly soluble in ether, insoluble in dilute aqueous acids and alkalis.

*Analysis.*—$C_{37}H_{48}O_{14}PN_3$: Molecular weight=789.74. Calculated: C, 56.27%; H, 6.12%. Found: C, 56.2%; H, 6.1%.

This compound is not described in the literature.

The starting compound was prepared from 3α-acetoxy-21-nitrato-20-bis-(nitratomethyl)-5β-pregnane-11-one by the action of ethanolic sodium hydroxide under nitrogen and under agitation at room temperature. The product was purified by recrystallization from warm ethanol and had a melting point of 110° and 174° C.

The product was soluble in alcohol, ether, acetone, benzene and chloroform, insoluble in water.

*Analysis.*—$C_{23}H_{35}O_{11}N_3$: Molecular weight=529.53. Calculated: C, 52.17%; H, 6.66%; N, 7.93%. Found: C, 52.5%; H, 6.9%; N, 7.9%.

*Step B—Preparation of 3α-phosphato-20-bis - (nitratomethyl)-21-nitrato-5β-pregnane-11-one.*—138 mg. of 3α-dibenzylphosphato-20-bis-(nitratomethyl)-21-nitrato - 5β-pregnane-11-one were placed in suspension in 8 cc. of ethanol. 20 mg. of palladized carbon black were added and hydrogenation was effected under theoretical conditions. The catalyst was separated and the solution obtained was evaporated to dryness under vacuum. 114 mg. of raw 3α-phosphato-20-bis-(nitratomethyl)-21-nitrato-5β-pregnane-11-one were obtained which was used as such for the preparation of the disodium salt.

The 3α-phosphato-20-bis-(nitratomethyl)-21-nitrato-5β-pregnane-11-one (acid form) occurred in the form of an amorphous, colorless solid. It was soluble in acetone, chloroform, methylene chloride, acetonitrile, aqueous pyridine and dilute aqueous alkalis, insoluble in water, alcohol and ether. Its instantaneous melting point was 220° to 240° C. with explosive decomposition.

Other identification constants:

Index of acidity_____ 177–179 (theoretical 184).
Percent nitrogen_____ 6.4 (theoretical 6.89%).
Loss under vacuum at 120° C_____ 4%.

This compound is not described in the literature.

The disodium salt of 3α-phosphato-20-bis-(nitratomethyl)21-nitrato-5β-pregnane-11-one was obtained by the action of sodium methylate on an ethanolic solution of the free acid.

The disodium salt of 3α-phosphato-20-bis-(nitratomethyl)-21-nitrato-5β-pregnane-11-one occurred in the form of a solid, colorless compound, crystallized in needles. It was soluble in water and insoluble in alcohol. Its melting point determined on the Kofler block was 255° C. (with decomposition). Percent nitrogen=6.2 (theoretical 6.44%).

This compound is not described in the literature.

EXAMPLE IV

*Preparation of 3α-Phosphato-20-Bis-(Hydroxymethyl)-5β-Pregnane-21-Ol-11-One*

*Step A—Preparation of 1'-[3α-dibenzylphosphato-5β-androstane - 11 - one - 17β - yl] - 3',5',8' - trioxa-bicyclo-(2,2,2)-octane.*—660 mg. of 1'-[5β-androstane-3α-ol-11-one-17β-yl]-3',5',8'-trioxa-bicyclo-(2,2,2)-octane were introduced under nitrogen into 10 cc. of pyridine. The mixture was cooled to −15° C. and 3.7 cc. of an ethereal solution of dibenzylchlorophosphonate containing 0.133 g. mols per 100 cc. were added. The temperature was allowed to climb to −5° C. and the solution was agitated for a period of an hour and a half at this temperature. The solution was allowed to stand quiescent for a period of about 15 hours in the refrigerator and then was agitated at +5° C. for a period of about 2 hours.

The reaction mixture was poured into iced water and the temperature was allowed to mount to +15° C. The precipitate was vacuum filtered, washed with water and dried. 1.166 g. of raw 1'-[3α-dibenzylphosphato-5β-androstane - 11 - one - 17β - yl] - 3',5',8' - trioxa - bicyclo-(2,2,2)-octane were obtained which was purified by solution in methylene chloride in the presence of pyridine, treatment of the solution with animal carbon black, concentration under vacuum, the residue taken up with ethanol in the presence of pyridine and crystallized. The crystals had a melting point of 185° C. and 191° C.

This compound was soluble in chloroform, slightly soluble in alcohol.

*Analysis.*—$C_{38}H_{49}O_8P$: Molecular weight=664.74. Calculated: C, 68.65%; H, 7.44%. Found: C, 68.6%; H, 7.5%.

This compound is not described in the literature.

The starting compound was prepared as described in copending, commonly assigned U.S. application Serial No. 172,039, filed January 23, 1962, now Pat. No. 3,079,-385, by reacting 3α-acyloxy-5β-androstane-11,17-dione with ethyl cyanoacetate to form the ethyl ester of 3α-acyloxy-20-cyano-Δ$^{17(20)}$-5β-pregnene-11-one-21-oic acid, hydrogenating the latter to form the ethyl ester of 3α-acyloxy-20-cyano-5β-pregnane-11-one-21-oic acid, simultaneously saponifying and hydrolyzing the latter to 20-carboxy-5β-pregnane-3α-ol-11-one-21-oic acid, esterifying the latter to form the dilower alkyl ester of the acid, reacting the diester with 2,3-dihydropyran to form the dilower alkyl ester of 3α-[2'-tetrahydropyranyloxy]-20-carboxy-5β-pregnane-11-one-21-oic acid, condensing the latter with benzyloxy chloromethane to form the dilower alkyl ester of 3α-[2'-tetrahydropyranyloxy]-20-carboxy-20-benzyloxymethyl-5β-pregnane-11-one-21-oic acid, hydrolyzing and reducing the latter to form 20-hydroxymethyl - 20 - benzyloxymethyl - 5β - pregnane - 3α,11β, 21-triol, subjecting the latter to catalytic hydrogenolysis to form 20-bis-(hydroxymethyl)-5β-pregnane-3α,11β,21-triol, esterifying and oxidizing the latter followed by saponification to form 20-bis-(hydroxymethyl)-5β-pregnane-3α,21-diol-11-one and then reacting the latter with ethyl orthoformate to form the starting compound 1'-(5β-androstane - 3α - ol - 11 - one - 17β - yl) - 3',5',8'-trioxa-bicyclo-[2,2,2]-octane.

It is particularly agreeable to obtain the disodium salt of 1'-[3α-phosphato-5β-androstane-11-one-17β-yl]-3',5', 8'-trioxa-bicyclo-(2,2,2)-octane, starting from 1'-[3α-dibenzylphosphato - 5β - androstane - 11 - one - 17β - yl]-3',5',8'-trioxa-bicyclo-(2,2,2)-octane by the following process:

To 20 mg. of palladized carbon black in 3 cc. of ethanol, there were added 124 mg. of 1'-[3α-dibenzylphosphato - 5β - androstane - 11 - one - 17β - yl] - 3',5',8'-trioxa-bicyclo-(2,2,2)-octane, 12 cc. of ethanol and 0.7 cc. of a solution of 0.565 N sodium methanolate and hydrogen was introduced for a period of about 30 minutes under agitation.

After 10 cc. of water were added, the solution was filtered and distilled under vacuum to a reduced volume, then added to 10 cc. of ethanol and allowed to crystallize. The crystals obtained were vacuum filtered, washed with ethanol and dried. 85 mg. of the disodium salt of 1'-[3α-phosphato - 5β - androstane - 11 - one - 17β - yl] - 3',5',8'-trioxa-bicyclo-(2,2,2)-octane were obtained, having a melting point above 300° C. The crystals were soluble in water, insoluble in ethanol.

*Analysis.*—$C_{24}H_{35}O_8PNa_2$: Molecular weight=528.49. Calculated: P, 5.86%. Found: P, 6.1%.

This compound is not described in the literature.

*Step B—Preparation of 3α-dibenzylphosphato-20-bis-(hydroxymethyl)-5β-pregnane-21-ol-11-one.*—500 mg. of 1' - [3α-dibenzylphosphato-5β-androstane-11-one-17β-yl]-3',5',8'-dioxo-bicyclo-(2,2,2)-octane were introduced into 10 cc. of methanol and 0.15 cc. of about 6 N hydrochloric acid. The solution was agitated for a period of about 1 hour and 5 cc. of water were slowly added. The mixture was cooled to 0° C. The crystals obtained were vacuum filtered, washed with iced aqueous methanol and dried. 445 mg. of 3α-dibenzylphosphato-20-bis-(hydroxymethyl)-5β-pregnane-21-ol-11-one were obtained having a melting point of 140° C.

The compound was soluble in alcohol, chloroform and in 65% methanol, insoluble in water.

This compound is not described in the literature.

*Step C—Preparation of 3α-phosphato-20-bis-(hydroxymethyl)-5β-pregnane-21-ol-11-one.*—Under nitrogen, 40 mg. of palladized carbon black containing 10% palladium were covered with 5 cc. of ethanol. Then a solution of 218 mg. of 3α-dibenzylphosphato-20-bis-(hydroxymethyl)-5β-pregnane-21-ol-11-one in 15 cc. of ethanol were added and hydrogen was introduced for a period of about 8 minutes. The catalyst was vacuum filtered and washed several times with alcohol. The filtrate and alcohol wash liquors were combined and evaporated to dryness under vacuum. The residue was taken up by a solution of sodium hydroxide, treated with animal carbon black and filtered. To the filtrate N hydrochloric acid was added. The mixture was heated to 60° C. and allowed to crystallize. The crystals obtained were vacuum filtered, washed with water and dried. 110 mg. of 3α-phosphato-20-bis-(hydroxymethyl)-5β-pregnane-21-ol-11-one having a melting point of 220° to 225° C. were obtained.

This compound was soluble in chloroform and dilute aqueous alkalis, soluble in hot alcohol and hot water.

*Analysis.* — $C_{23}H_{39}O_8P$: Molecular weight=474.52. Calculated: P, 6.52%. Found: P, 6.6%.

This compound is not described in the literature.

The said product was easily transformed into the disodium salt of 3α-phosphato-20-bis-(hydroxymethyl)-5β-pregnane-21-ol-11-one which is not described in the literature by reaction with sodium methylate.

The 3α-phosphato-20-bis-(hydroxymethyl)-5β-pregnane-21-ol-11-one was subjected to the action of a mixture of fuming nitric acid and acetic acid anhydride at a low temperature of about −10° C. and 3α-phosphato-20-bis-(nitratomethyl)-21-nitrato-5β-pregnane-11-one (I, with R=NO₂) was obtained which in its turn could be transformed into the corresponding disodium salt by the procedure of Example I.

EXAMPLE V

*Preparation of 3α-Acetoxy-20-Bis-(Dihydrogenophosphatomethyl)-5β-Pregnane-21-Ol-11-One*

*Step A—Preparation of 3α-acetoxy-20-bis-(dibenzylphosphatomethyl)-5β-pregnane-21-ol-11-one.*—145 mg. of 3α-acetoxy-20-bis-hydroxymethyl-5β-pregnane-21-ol-11-one were introduced into 1.5 cc. of pyridine. The mixture was cooled to −20° C. and 1.6 cc. of an ethereal solution containing 1 mM./cc. of dibenzyl chlorophosphonate were added. The mixture was agitated at the same temperature for a period of about two hours and allowed to remain overnight under nitrogen at −10° C.

The reaction mixture was poured into a mixture of ice and hydrochloric acid and extracted several times with methylene chloride. The combined extracts were washed successively with water, with an aqueous solution containing 10% sodium carbonate, with water and with salt water. The solution was dried over magnesium sulfate and subjected to a distillation. An oil was obtained which contained 3α-acetoxy-20-bis-(dibenzylphosphatomethyl)-5β-pregnane-21-ol-11-one which was fractionated by successive chromatography over silica gel and magnesium silicate with elutions of methylene chloride containing 2% methanol. 190 mg. of raw product were obtained which were used as such for the next step of the synthesis.

This compound is not described in the literature.

The starting compound was prepared as in Example I.

*Step B—Preparation of 3α-acetoxy-20-bis-(dihydrogenophatomethyl)-5β-pregnane-21-ol-11-one.*—170 mg. of the compound prepared in step A were covered with 8 cc. of ethanol. 40 mg. of palladized carbon black containing 10% palladium were added and the mixture was subjected to hydrogenation under agitation for a period of 90 seconds. The mixture was filtered and the solution was evaporated to dryness under vacuum. The resinous residue was taken up with ether, filtered and 104 mg. of 3α-acetoxy-20-bis-(dihydrogenophosphatomethyl)-5β-pregnane-21-ol-11-one were obtained having a sharp melting point toward 150° C.

This compound is soluble in water, alcohol and dilute aqueous alkalis, insoluble in ether and benzene.

*Analysis.*—$C_{25}H_{42}O_{12}P_2$: Molecular weight=596.52. Calculated: C, 50.53%; H, 7.10%; P, 10.38%. Found: C, 50.1%; H, 6.9%; P, 10.6%.

This compound is not described in the literature.

Other acyl derivatives can be obtained by reacting the steroids under the same conditions with other acylating agents such as sulfuric acid, phosphoric acid, benzoyl chloride, hexahydrobenzoyl chloride, propionic acid anhydride, etc.

The activity of the compounds of the invention on the coronary blood flow of the isolated heart of a rabbit at low concentrations with their low toxicity allows their use in the treatment of angina of the chest and coronitis. The compounds also have a peripheral vasodilatatory action and anti-spasmodic effects allowing their use in asthma, bronchial spasms and arterial spasms. The alkali metal salts are water soluble and are particularly suitable for administration by transcutaneous injection.

The compounds of the invention can be made up and used in the form of injectable solutions, injectable suspensions prepared in ampules, in flasks, in the form of tablets, drops and suppositories. The dosage utilized is controlled in the adult according to the method of administration between 1 and 10 mg. per amount and per day for 3α-acetoxy-20-nitratomethyl-21-nitrato-5β-pregnane-20-ol-11-one, 1 and 10 mg. per amount and per day for 20-hydroxymethyl-5β-pregnane-3α,20,21-triol-11-one, 1 and 5 mg. per amount and per day for 3α-acetoxy-20-bis-(nitratomethyl)-21-nitrato-5β-pregnane-11-one, 2 and 10 mg. per amount and per day for 20-bis-(hydroxymethyl)-5β-pregnane-3α,21-diol-11-one, and 2 and 10 mg. per amount and per day for 20-hydroxymethyl-5β-pregnane-3α,21-diol-11-one, and between 1 and 5 mg. for 3α-21-diacetoxy-20-acetoxymethyl-5β-pregnane-20-ol-11-one. The pharmaceutical compositions such as injectable solutions, injectable suspensions, tablets, suppositories, may be prepared according to the usual techniques.

TABLE III

| Compound | Daily Dose For Adults, mg. | Dose in Tablet Form, mg. | Dose in Intramuscular Method, mg. | Dose in Venous Method, mg. |
|---|---|---|---|---|
| 3α-acetoxy-21-nitrato-20-nitratomethyl-5β-pregnane-11-one | 2 to 10 | 1 to 2 | 1 to 2 | 1 to 2 |
| 3α-acetoxy-21-nitrato-20-nitratomethyl-5β-pregnane-20-ol-11-one | 2 to 10 | 2 | 2 to 5 | 2 to 5 |
| 20-hydroxymethyl-5β-pregnane-3α,20,21-triol-11-one | 5 to 20 | 2 to 5 | 2 to 5 | 2 to 5 |
| 3-αacetoxy-20-bis-(nitratomethyl)-21-nitrato-5β-pregnane-11-one | 1 to 5 | 1 | 1 to 2 | 1 to 2 |
| 20-bis-(hydroxymethyl)-5β-pregnane-3α,21-diol-11-one | 2 to 10 | 2 to 5 | 2 to 5 | 2 to 5 |
| 20-hydroxymethyl-5β-pregnane-3α,21-diol-11-one | 2 to 10 | 1 to 2 | 1 to 2 | 1 to 2 |
| 3α,21-diacetoxy-20-acetoxymethyl-5β-pregnane-20-ol-11-one | 1 to 5 | | | |
| 3-potassium sulfate of 20-bis-(nitratomethyl)-21-nitrato-5β-pregnane-3α-ol-11-one | 5 to 50 | 5 | 10 to 20 | 10 to 20 |
| Disodium salt of 3α-phosphato-20-bis-(nitratomethyl)-21-nitrato-5β-pregnane-11-one | 20 to 100 | 10 to 30 | 10 to 30 | 10 to 30 |

PHARMACOLOGICAL STUDY ON CORONARY BLOOD FLOW

The action of the following compounds on coronary blood flow has been studied on the isolated rabbit heart utilizing a technique inspired by De Langendorff (Arch. gesam. Physiol. 61,291, 1895).

In this method, the heart was suspended by an aorta to a canal and the coronary system was perfused by means of this canal under a constant pressure of 5 cm. of mercury, with Locke serum of a pH of 7.2 to 7.3, heated to 37° C. The compounds to be studied were placed in solution in ethanol. The solutions were diluted with Locke serum to a convenient concentration.

On a proper instrument, the coronary blood flow and simultaneously the ventriculary contractions were measured. A systematic research was made to determine the limiting concentration of the said compounds which clearly increase the blood flow and Table IV shows the results obtained with the compounds as compared with trinitrine and papaverine under the same experimental conditions.

thereof, and it is to be understood that the invention be limited only as defined in the appended claims.

We claim:
1. A compound having the formula

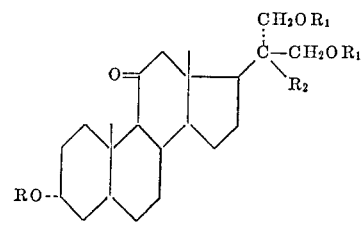

wherein R and $R_1$ are selected from the group consisting of hydrogen, an anion of a mineral acid and an acyl radical of an organic carboxylic acid having 1 to 18 carbon atoms and $R_2$ is selected from the group consisting of hydrogen, —$CH_2OR_1$ and —$OR_1$.

2. 20 - bis - (hydroxymethyl)-5β-pregnane-3α,21-diol-11-one.

TABLE IV

| Compounds Studied | Active Limiting Concentration in μg. per cc. in the perfusion liquid | Increase in blood flow in percent over normal blood flow | Duration of action in minutes | Effect on Ventricular Contractions, percent | |
|---|---|---|---|---|---|
| | | | | On the Amplitude | On the Frequency |
| Trinitrine | 1 | 10 | 2–20 | 0 | −5 |
| Papaverine | 10 | 20 | 15 | 0 | 0 |
| 3α - acetoxy - 20 - nitrato - methyl - 21 - nitrato-5β-pregnane-11-one | 0.001 | 13 | >23 | 0 | +12 |
| 3α - acetoxy - 20 - nitrato - methyl - 21 - nitrato-5β-pregnane-20-ol-11-one | 0.002 | 15 | >25 | 0 | 0 |
| 20 - hydroxymethyl - 5β - pregnane - 3α,20,21-triol-11-one | 0.005 to 0.001 | 30 | >22 | 0 | 0 |
| 3α,21 - diacetoxy - 20 - acetoxymethyl - 5β - pregnane-20-ol-11-one | 0.005 to 0.01 | 10–20 | 15 | 0 | 0 |
| 3α - acetyxy - 20 - bis - (nitratomethyl) - 21 - nitrato-5β-pregnane-11-one | 0.0001 | 10 | >30 | 0 | 0 |
| | 0.001 | 40 | >30 | 0 | 0 |
| 20 - bis - (hydroxymethyl) - (5β) - pregnane-3α,21-diol-11-one | 0.005 | 19 | 16 | 0 | 0 |
| 20 - hydroxymethyl - (5β) - pregnane - 3α,21-diol-11-one | 0.001 | 30 | 30 | 0 | 0 |
| 3-potassium sulfate of 20-bis-(nitratomethyl)-21-nitrato-5β-pregnane-3α-ol-11-one | 0.01 | 20 | 10 | 0 | −5 |
| Disodium salt of 3α-phosphato-20-bis-(nitratomethyl)-21-nitrato-5β-pregnane-11-one | 0.01–0.05 | 25 | 30 | 0 | 0 |

ACUTE TOXICITY

Tests on toxicity were made on mice of the Rockland strain weighing between 18 and 22 gm. The compounds to be studied were suspended at a rate of 10 mg. per cc. in an appropriate dispersive solute. They were injected in this form subcutaneously in two groups of ten mice in doses of 50 and 100 mg./kg. respectively. The animals were held under observation for a period of one week. No symptoms of intoxication nor mortality were noted in the course of this period. The said compounds are thus devoid of toxicity even in a dosage of 100 mg./kg. The compounds tested were 3α-acetoxy-20-nitratomethyl-21-nitrato - 5β-pregnane-20-ol-11-one, 20-hydroxymethyl-5β-pregnane-3α,20,21-triol-11-one, 3α,21-diacetoxy-20-acetoxymethyl-5β-pregnane-20-ol-11-one, 3α-acetoxy-20-bis-(nitratomethyl) - 21-nitrato-5β-pregnane-11-one, 20-bis-(hydroxymethyl)-5β-pregnane-3α,21-diol-11-one, 3-potassium sulfate of 20-bis-(nitratomethyl)-21-nitrato-5β-pregnane-3α-ol-11-one and 20-hydroxymethyl-5β-pregnane-3α, 21-diol-11-one.

This application is a continuation-in-part application of copending U.S. application Serial No. 116,976, filed June 14, 1961, now abandoned.

Various modifications of the process of the invention may be made without departing from the spirit or scope 3. 20 - hydroxymethyl - 5β - pregnane-3α,20,21-triol-11-one.
4. 20-hydroxymethyl-5β-pregnane-3α,21-diol-11-one.
5. A compound having the formula

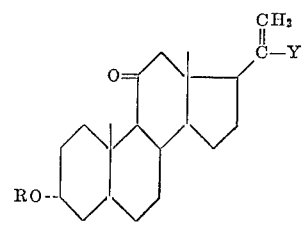

wherein R is selected from the group consisting of hydrogen, an anion of a mineral acid and an acyl radical of an organic carboxylic acid having 1 to 18 carbon atoms and Y is selected from the group consisting of —$CH_2OR$ and —CHO.

6. 20-methylene-5β-pregnane-3α-ol-11,21-dione.
7. 20-methylene-5β-pregnane-3α,21-diol-11-one.
8. 3α-acetoxy-20-methylene-5β-pregnane-11,21-dione.
9. 3α,21-diacetoxy-20-methylene-5β-pregnane-11-one.

10. The 3α-phosphato-bis-hydroxymethyl pregnane of the formula:

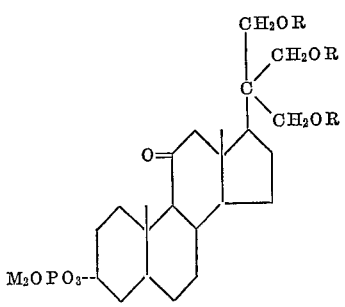

in which R is selected from the group consisting of hydrogen, an acyl radical of an organic carboxylic acid having 1 to 18 carbon atoms and an anion of a mineral acid and M is selected from the group consisting of hydrogen, alkali metals, alkaline earth metals and organic bases.

11. 3α-phosphato-20-bis-(hydroxymethyl)-5β-pregnane-21-ol-11-one.

12. 3α-phosphato-20-bis-(nitratomethyl)-21-nitrato-5β-pregnane-11-one.

13. The disodium salt of 3α-phosphato-20-bis-(nitratomethyl)-21-nitrato-5β-pregnane-11-one.

14. The disodium salt of 3α-phosphato-20-bis-(hydroxymethyl)-5β-pregnane-21-ol-11-one.

15. 3α-dibenzylphosphato-20- bis - (nitratomethyl)-21-nitrato-5β-pregnane-11-one.

16. 1'-[3α-dibenzylphosphato - 5β - androstane-11-one-17β-yl]-3',5',8'-trioxa-bicyclo-(2,2,2)-octane.

17. The disodium salt of 1'-[3α-phosphato-5β-androstane-11-one-17β-yl]-3',5',8'- trioxa-bicyclo - (2,2,2) - octane.

18. 3α - dibenzylphosphato-20-bis-(hydroxymethyl)-5β-pregnane-21-ol-11-one.

19. 3α-acetoxy - 20 - bis(dibenzylphosphatomethyl)-5β-pregnane-21-ol-11-one.

20. A process for the preparation of compounds having the formula

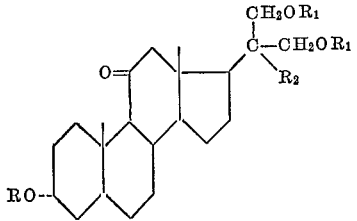

wherein R and $R_1$ are selected from the group consisting of hydrogen, an anion of a mineral acid and an acyl radical of an organic carboxylic acid having 1 to 18 carbon atoms and $R_2$ is selected from the group consisting of hydrogen, —$CH_2OR_1$ and —$OR_1$ which comprises oxidizing 3α-oxygenated $\Delta^{17(20)}$-5β-pregnene-21-ol-11-one to form 3α-oxygenated $\Delta^{17(20)}$-5β-pregnene - 11,21 - dione, catalytically hydrogenating the latter to form 3α-oxygenated-5β-pregnane-11,21-dione, reacting the said product with formaldehyde in a water-miscible organic solvent in the presence of an alkaline agent to form a mixture of 3α-oxygenated-20-bis-(hydroxymethyl) - 5β-pregnane-21-ol-11-one, 3α-oxygenated-20-hydroxymethyl-5β-pregnane-21-ol-11-one and 3α-oxygenated-20 - methylene-5β-pregnane-11,21-dione, recovering 3α-oxygenated-20-bis-(hydroxymethyl)-5β-pregnane-21-ol-11-one and 3α-oxygenated-20-hydroxymethyl-5β-pregnane-21-ol-11-one, reducing 3α-oxygenated-20-methylene-5β-pregnane-11,21-dione with an alkali metal borohydride to form 3α-oxygenated-20-methylene-5β-pregnane-21-ol-11-one, treating the latter with osmium tetraoxide to form 3α-oxygenated-20-hydroxymethyl-5β-pregnane-20,21-diol-11-one and recovering said product.

21. A process for the preparation of compounds having the formula

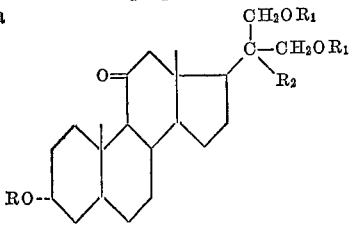

wherein R and $R_1$ are selected from the group consisting of hydrogen, an anion of a mineral acid and an acyl radical of an organic carboxylic acid having 1 to 18 carbon atoms and $R_2$ is selected from the group consisting of hydrogen, —$CH_2OR_1$ and —$OR_1$ which comprises oxidizing $\Delta^{17(20)}$-5β-pregnene-3α 21-diol-11-one to form $\Delta^{17(20)}$-5β-pregnene- 3α-ol-11,21-dione, acylating and catalytically hydrogenating the 3α-acyloxy $\Delta^{17(20)}$-5β-pregnene-11,21-dione obtained in the presence of palladized carbon to form 3α-acyloxy-5β-pregnane-11,21-dione, reacting a compound selected from the group consisting of the said product and its corresponding 3α-hydroxy derivative formed by saponification with formaldehyde in dimethyl formamide in the presence of calcium oxide to form a mixture of 20-bis-(hydroxymethyl)-5β-pregnane-3α, 21-diol-11-one, 20-hydroxymethyl-5β-pregnane-3α, 21-diol-11-one, and their 3α-acyloxy derivatives, reducing 20-methylene-5β-pregnane-3α-ol - 11,21 - dione with sodium borohydride to form 20-methylene-5β-pregnane-3α,21-diol-11-one, acylating the latter in the 3-and the 21-position, treating the latter with osmium tetraoxide to form after saponification 20-hydroxymethyl-5β-pregnane-3α,20,21-triol-11-one and recovering said product.

22. A compound having the formula

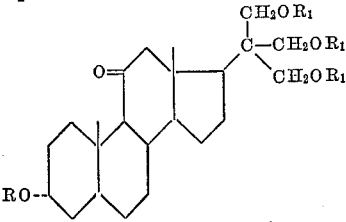

wherein R and $R_1$ are selected from the group consisting of hydrogen, an anion of a mineral acid and an acyl radical of an organic carboxylic acid having 1 to 18 carbon atoms.

23. A compound having the formula

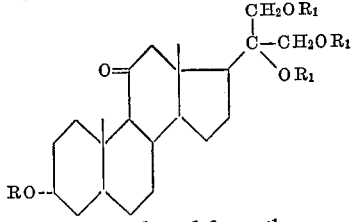

wherein R and $R_1$ are selected from the group consisting of hydrogen, an anion of a mineral acid and an acyl radical of an organic carboxylic acid having 1 to 18 carbon atoms.

24. A compound having the formula

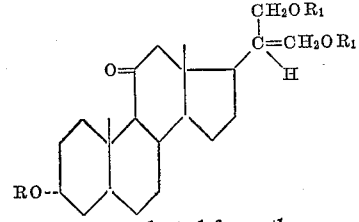

wherein R and $R_1$ are selected from the group consisting of hydrogen, an anion of a mineral acid and an acyl radical of an organic carboxylic acid having 1 to 18 carbon atoms.

No references cited.

UNITED STATES PATENT OFFICE
CERTIFICATE OF CORRECTION

Patent No. 3,120,518  February 4, 1964

Daniel Bertin et al.

It is hereby certified that error appears in the above numbered patent requiring correction and that the said Letters Patent should read as corrected below.

In the heading to the printed specification, line 2, in the title, before "POLYHYDROXYLATED" insert -- NOVEL --; column 1, lines 52 to 62, the formula should appear as shown below instead of as in the patent:

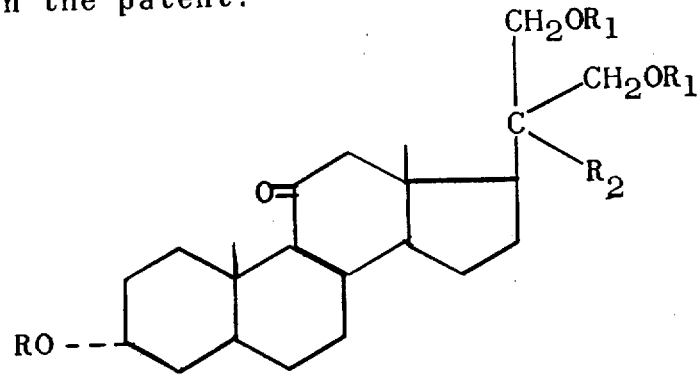

columns 5 and 6, TABLE II, third line of structural formulas, the second formula should appear as shown below instead of as in the patent:

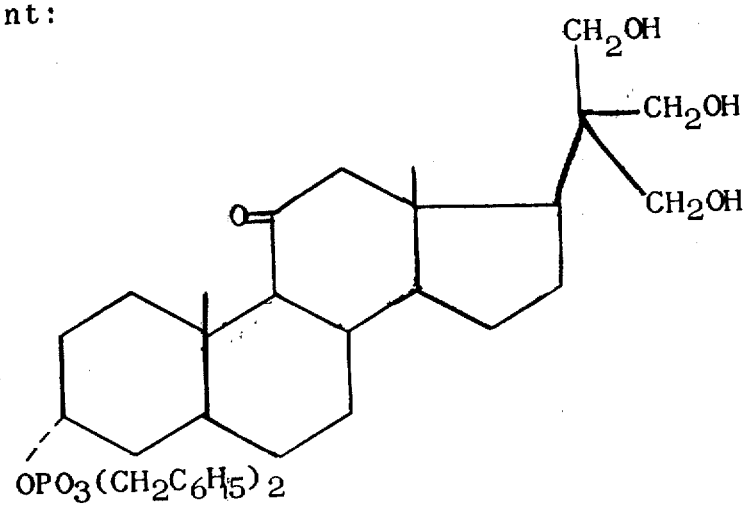

3,120,518 column 7, line 75, for "=55" read -- =+55 --; column 14, line 25, for "asthma." read -- asthma, --; columns 15 and 16, TABLE IV, first column, line 11 thereof, for "-acetyxy-" read -- -acetoxy- --; column 17, line 38, after "-bis" insert a hyphen.

Signed and sealed this 8th day of September 1964.

(SEAL)
Attest:

ERNEST W. SWIDER

Attesting Officer

EDWARD J. BRENNER

Commissioner of Patents